US007000833B2

(12) United States Patent
Sato

(10) Patent No.: US 7,000,833 B2
(45) Date of Patent: Feb. 21, 2006

(54) ARTICLE DATA READING APPARATUS

(75) Inventor: Shigeru Sato, Kanagawa-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/373,184

(22) Filed: Feb. 26, 2003

(65) Prior Publication Data

US 2003/0226891 A1 Dec. 11, 2003

(30) Foreign Application Priority Data

Mar. 22, 2002 (JP) ....................................... 2002-081516

(51) Int. Cl.
*G06K 15/00* (2006.01)

(52) U.S. Cl. ......................... 235/383; 235/385; 902/22; 186/59

(58) Field of Classification Search ................. 235/383, 235/385; 902/22; 186/59, 61
See application file for complete search history.

(56) References Cited

U.S. PATENT DOCUMENTS

| | | | | | |
|---|---|---|---|---|---|
| 4,963,721 | A | | 10/1990 | Kohno et al. | 186/61 |
| 4,972,018 | A | * | 11/1990 | Leadbetter | 524/47 |
| 4,988,851 | A | | 1/1991 | Kohno et al. | 186/61 |
| 5,083,638 | A | * | 1/1992 | Schneider | 186/61 |
| 5,560,450 | A | * | 10/1996 | Kouno | 186/61 |
| 5,978,772 | A | * | 11/1999 | Mold | 705/16 |
| 6,047,262 | A | * | 4/2000 | Lutz | 705/16 |
| 6,588,549 | B1 | * | 7/2003 | Wike et al. | 186/61 |
| 6,598,791 | B1 | * | 7/2003 | Bellis et al. | 235/383 |

FOREIGN PATENT DOCUMENTS

| | | |
|---|---|---|
| JP | H01-173193 | 7/1989 |
| JP | 2-188400 | 7/1990 |
| JP | H06-266961 | 9/1994 |
| JP | 2001-76261 | 3/2001 |
| JP | 2001-184563 | 7/2001 |

OTHER PUBLICATIONS

Aug. 25, 2004 Japanese Office Action for JP–2002–081516, pp. 1–14.
Office Action for Japanese Patent Appication No. JP–2002–081516, dated Aug. 25, 2004.

* cited by examiner

*Primary Examiner*—Diane I. Lee
*Assistant Examiner*—Seung H Lee
(74) *Attorney, Agent, or Firm*—Pillsbury Winthrop Shaw Pittman LLP

(57) ABSTRACT

An article data reading apparatus having a first display 4 receiving operational entry from a customer or store clerk as an operator of the apparatus permits setting of operation mode to customer operation mode or store-clerk operation mode. In the customer operation mode, customer operation information relating to operations by the customer when a customer becomes the operator is displayed on the first display 4; in the store-clerk operation mode, store-clerk operation information relating to operations by the store clerk when a store clerk becomes the operator is displayed on the first display 4. Thus, read operability for both customer and store clerk can be improved.

11 Claims, 6 Drawing Sheets

ARTICLE DATA READING APPARATUS

BACKGROUND OF THE INVENTION

1. Field of the Invention

The present invention relates to an article data reading apparatus used for optically reading coded symbols attached to articles, being connected to an article sales registration data processing apparatus as a part of a checkout system at supermarkets or elsewhere.

2. Description of Related Art

Conventionally, there has been used at supermarkets or elsewhere an article data reading apparatus that inputs information pertaining to sale articles to an article sales registration data processing apparatus, for example a POS (Point of Sales) terminal, by optically reading a coded symbol as an article code, for example a barcode, attached to each of articles using a barcode scanner as a reading section in the data reading apparatus.

Such an article data reading apparatus is structured so that an operator operates the barcode scanner for reading the object. In general, on operating an article data reading apparatus at stores, a store clerk becomes an operator to operate the apparatus. Recently, however, there come up some apparatuses having an operating mode that permits changing of the operator from a store clerk to a customer or vice versa depending on hours of crowding at stores. In such a case, it is practiced that, for example, when a store is crowed with customers, a store clerk operates the apparatus; when a store is less crowded, a customer does it.

However, there is a problem in which, although such an article data reading apparatus is not difficult to operate for a store clerk who is accustomed to the apparatus and familiar to its operation, it is difficult for a customer who is not accustomed to the apparatus to operate it.

SUMMARY OF THE INVENTION

An object of the present invention is to provide an article data reading apparatus having excellent operability for both customers and store clerks.

This object can be achieved by an article data reading apparatus comprising an article table for placing articles for sale, a reading section for optically reading coded symbols attached to the articles, a first display for displaying information facing to an operator, a second display for displaying information installed at a position opposed to the first display, operation mode setting means for selectively setting operation mode to a customer operation mode in which a customer performs as an operator and a store-clerk operation mode in which a store clerk performs as the operator, first display means for displaying article information on the first display in the customer operating mode based on the coded symbols of the articles that have been read by the reading section, second display means for displaying article information based on the coded symbols of the articles that have been read by the reading section on both the first display and the second display in the store-clerk operating mode.

DETAILED DESCRIPTION OF A PREFERRED EMBODIMENT OF THE INVENTION

The article data reading apparatus according to one embodiment of the present invention will be described in conjunction with FIGS. 1 thru 7. The article data reading apparatus according to the present embodiment is connected to a POS terminal as an article sales registration data processing apparatus which forms a part of a checkout system at supermarkets, and is applied for an article data reading apparatus that optically reads barcodes as coded symbols that are attached to articles using a barcode scanner as a reading section of the terminal operated by an operator.

Figure 1:
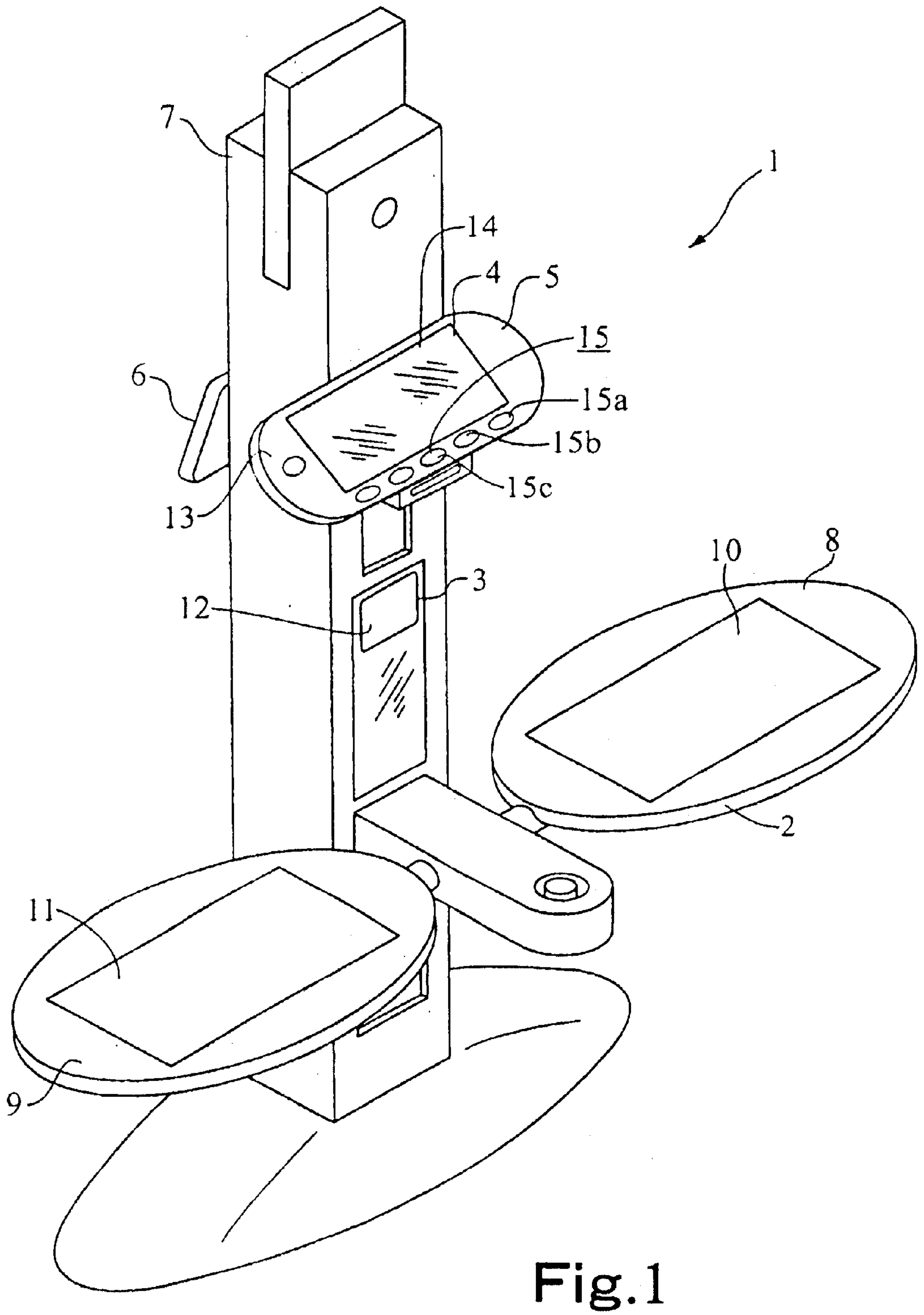
FIG. 1 is a perspective view of an article data reading apparatus according to one embodiment of the present invention.

FIG. 1 is a perspective view of an article data reading apparatus according to one embodiment of the present invention. This article data reading apparatus 1 according to the present embodiment is structured so as to permit one to set to two operation modes: one is a mode (so-called self-checkout mode) for operations by a customer, referred to as "customer operation mode," where a customer acts as the operator; the other is a mode for operations by a store, referred to as "store-clerk operation mode," in which a store clerk act as the operator while a customer does as an operation requester with the two facing to each other interposing the article data reading apparatus. The article data reading apparatus 1 also provides an abuse detecting means, in which notification is made so if it should be detected that any of the articles whose barcode has not been read by going through an inspection process of comparing respective weights to each other of the articles before and after the barcode reading, while a customer intending to purchase article(s) for sale is operating the apparatus.

Now, a structure of the article data reading apparatus 1 will be described. As shown in FIG. 1, the article data reading apparatus 1 comprises an article table 2 on which articles or a shopping basket is put, a barcode scanner 3 that optically reads a barcode attached to an article, an operating section 5 including a first display 4, and a second display 6. Each of these sections is mounted to a vertically long stem 7. The article table 2, barcode scanner 3, and operating section 5 are mounted sequentially from the lower position to the top thereof at a first side of the stem 7, and a second display 6 at a second side of the stem. This article data reading apparatus 1 accepts a store clerk or customer as the operator at the first side of the stem 7, while it accepts a customer who becomes an operation requester requesting a store clerk for operations at the second side of the stem 7 when a store clerk operates the apparatus.

The article table 2 is comprised of a first article table 8 as a first article table section positioned on the right of the stem 7 viewed from the operator, and a second article table 9 as a second article table section positioned on the left of the stem 7 from the operator. On the first article table 8, articles before barcode reading by the barcode scanner 3 are to be placed, while on the second article table 9 are placed those for which the barcode readings by barcode scanner 3 are finished.

The first and second article tables 8, 9 have first and second scales 10,11 built-in, respectively. The first and second scales 10, 11 weigh each of a total weight of articles placed on the first article table 8 and the second article table 9, respectively, and output the respective measured weights as electrical signals.

The barcode scanner 3 provides a barcode reading window 12 directing to the operator. Inside the barcode scanner 3 in the vicinity of the barcode reading window 12, an optical system including a laser light source, a photoreceptor, etc. is provided. The barcode scanner 3 irradiates laser lays through the barcode reading window 12. The Laser rays are reflected from a barcode attached to an article, and the reflected laser rays are detected by the photoreceptor within the barcode scanner 3. The scanner reads information on the article through predetermined electric processing applied to the received signal.

The first display 4 provided in the operating section 5 is mounted onto an operating plate 13 that faces to the operator in the operating section 5. The first display 4 displays customer operation screens for the customer operations or store clerk operation screens for the store clerk operations depending on the operation mode. Onto a surface of the first display 4, a touch-panel 14 is fixed. The first display 4 receives operational entries by the operator performing a function similar to that of a keyboard by obtaining positional coincide between a key image displayed on the first display 4 and a coordinate on the touch panel 14 at a point where an operator touched.

On the operating plate 13 of the operating section 5, there are provided operation keys 15 on the periphery of the first display 4 that receive operator's entries. The operation keys 15 include an operation-end key 15*a* that outputs, upon depressed, a signal for declaring end of processing in the article data reading apparatus 1, an end-of-read key 15*b* that outputs, upon depressed, a signal for declaring end of operation of reading barcodes by the barcode scanner 3, and an operation mode switching key 15*c* that outputs , upon depressed, a signal for switching the operation mode.

The second display 6 is provided so as to face to a customer as an operator requester. This second display 6 displays article information based on a barcode read by the barcode scanner 3. A customer as an operation requester can confirm a deal by this article information displayed in the second display 6.

Figure 2:
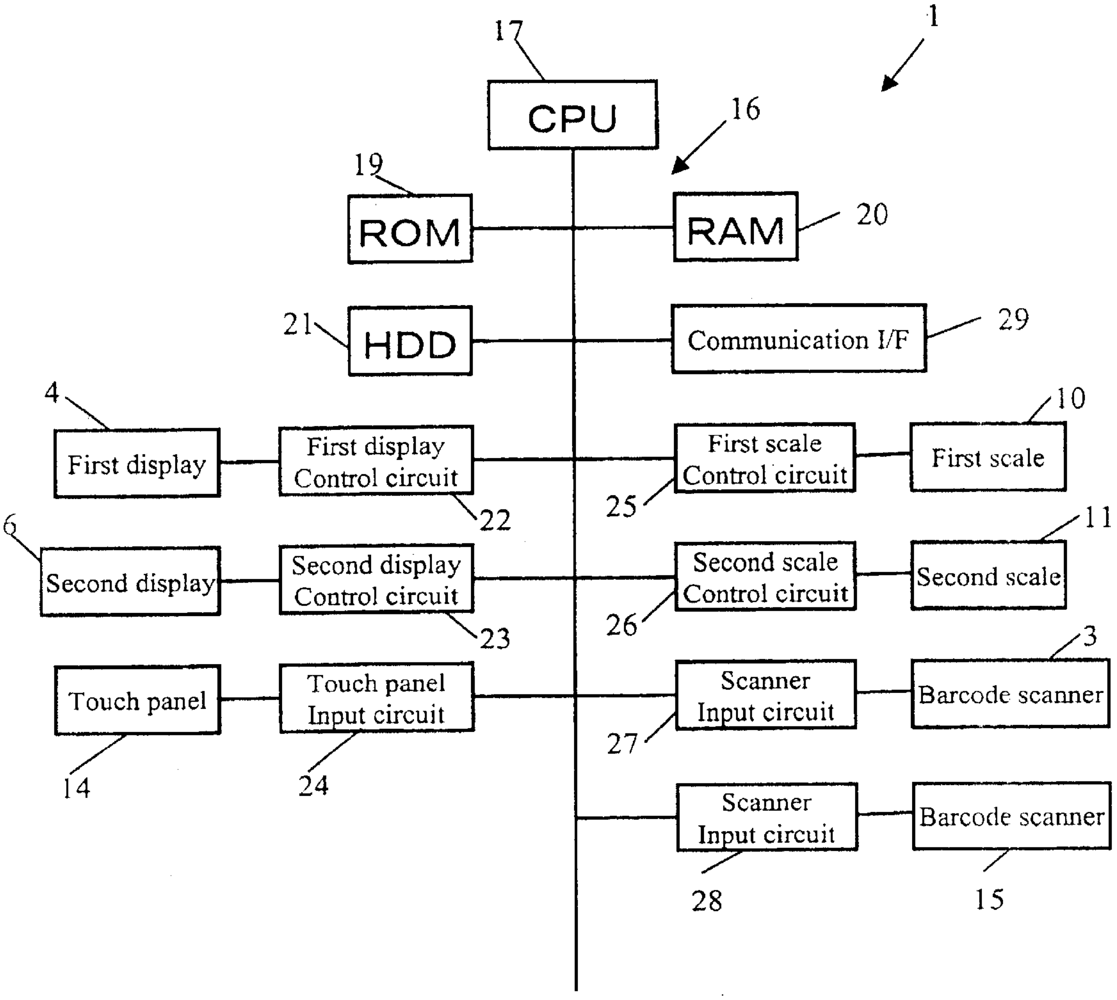
FIG. 2 is a block diagram showing electrical connections between sections that the article data reading apparatus provides.

Next, electrical connections between the respective sections provided in this article data reading apparatus 1 will be described in conjunction with FIG. 2. As shown in FIG. 2, the article data reading apparatus 1 contains a microcomputer 16, which controls to drive each of the sections. The microcomputer 16 is organized such that a ROM (Read Only Memory) 19 storing stationary programs or the like and a RAM (Random Access Memory) 20 functioning as a rewritable memory for a work area of various data and an image memory are connected through a bus 18 to a CPU (Central Processing Unit) 17 that centrally controls each section. To the bus 18 to which the CPU 17 is connected, there is also connected a HDD (Hard Disk Drive) 21 as a storage section that stores control programs operating the microcomputer 16. This HDD 21 stores also various data files besides the control programs. The various data files include screen data files, PLU (Price Look Up) file, etc. In the screen data files, there is memorized various display data of operative information regarding operations to be displayed on the first display 4 by unit of page of a screen that corresponds to each of operations. Herein, the operative information includes customer's operational information relating to operations performed by a customer when a customer acts as the operator, and store-clerk's operational information relating to operations by a store-clerk when a store clerk acts as the operator. The PLU file contains unit price and a weight for each of articles for sale.

At the startup of the article data reading apparatus 1, the control programs stored in the HDD 21 are transferred to and written into the RAM 20 along with the image data files and the PLU file, etc., so that the microcomputer 16 is enabled to control the respective sections to be driven. Now, description will be made for each of the sections of the article data reading apparatus 1 that is controlled to be driven by the microcomputer 16 within the apparatus.

The first and second displays 4, 6 are connected to the bus 18 through the first and second display control circuits 22, 23. When display data is input from the microcomputer 16 to the first and second display control circuits 22, 23, the first and second displays 4, 6 display predetermined items being driven by the first and second display control circuits 22, 23. Also, when the first and second display control circuits 22, 23 receive a current-on or current-off signal from the microcomputer 16, the circuits turn on or off electric current to the first and second displays 4, 6.

The touch panel 14 is also connected to the bus 18 through a touch panel input circuit 24. The touch panel input circuit 24 recognizes a position on the panel where the operator has touched in terms of a X-Y coordinate thereof, acquires related coordinate data, and sends a signal representing this coordinate data to the microcomputer 16. Upon receiving this signal, the microcomputer 16 performs predetermined processing according to the signal.

The first and second scales 10, 11 are connected to the bus 18 through the first and second scale control circuits 25, 26. The first and second scale control circuits 25, 26 output weight information attained by measurement to the microcomputer 16. When the first and second scale control circuits 25, 26 receive the current-on or current-off signal from the microcomputer 16, control is made by the first and second scale control circuits 25, 26 so as to acquire or not acquire weight information from the first and second scales 10, 11. If not acquired, control is made preferably to turn off the electric current to both the first and second scales so that acquisition of the weight information from the first and second scales 10, 11 is disabled.

The barcode scanner 3 is also connected to the bus 18 though a scanner input circuit 27. The scanner input circuit 27 outputs to the microcomputer 16 barcode information that has been read.

The operation keys 15 are connected to the bus 18 through an operation key entry circuit 28. The operation key entry circuit 28 outputs to the microcomputer 16 a signal representing an operation key 15 that has been depressed. Upon receipt of the signal, the microcomputer 16 performs predetermined processing according to the signal.

Also connected to the bus 18 is a communication I/F 29 that performs data communications with a POS terminal, not shown. This communication I/F is also under control of the microcomputer 16.

Now, description will be made for operation mode switching processing and article information read processing, which are functions executed by the microcomputer 16 according to the control programs stored in the HDD 21 in the article data reading apparatus 1.

Figure 3:
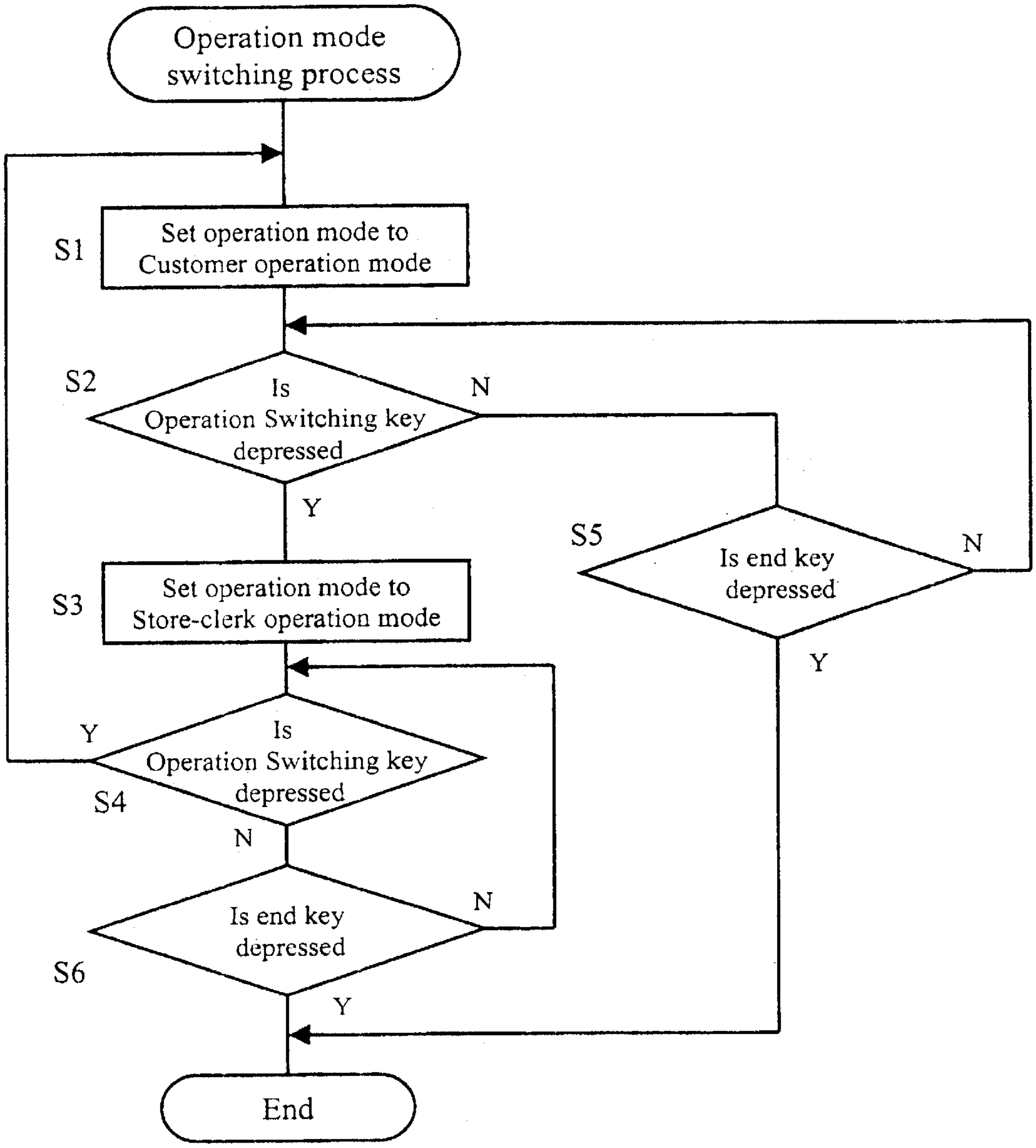
FIG. 3 is a flow chart exhibiting a flow in the operation mode switching processing.
Figure 4:
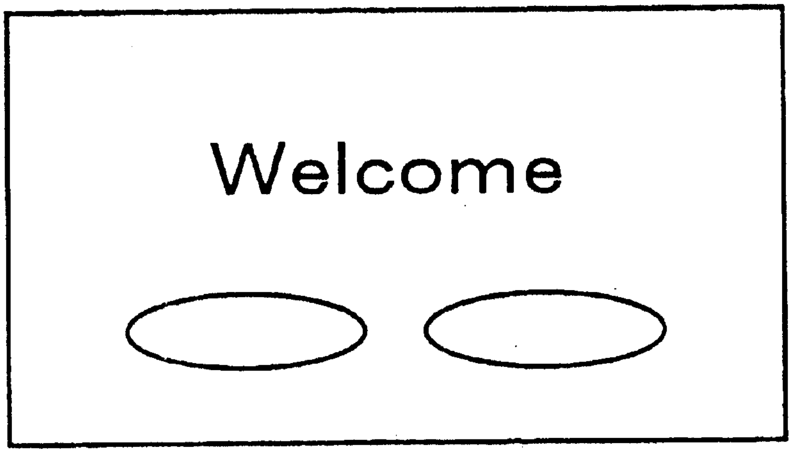
FIG. 4 is a front view of the first display displaying an example of a screen in the customer operation mode.
Figure 5:
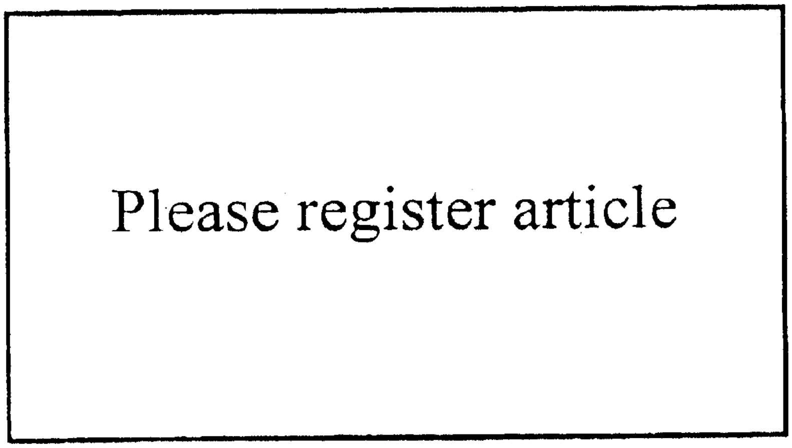
FIG. 5 is a front view of the first display displaying another example of a screen in the customer operation mode.
Figure 6:
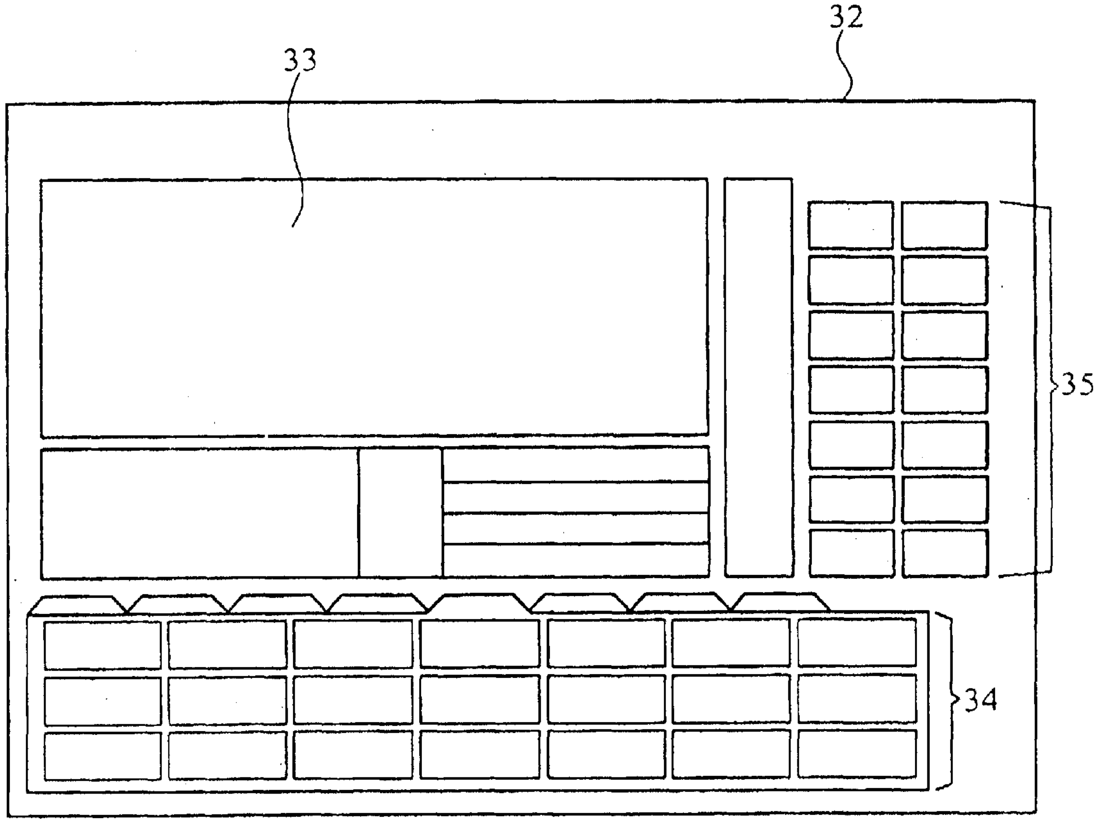
FIG. 6 is a front view of the first display displaying an example of a screen in the store-clerk operation mode.
Figure 7:
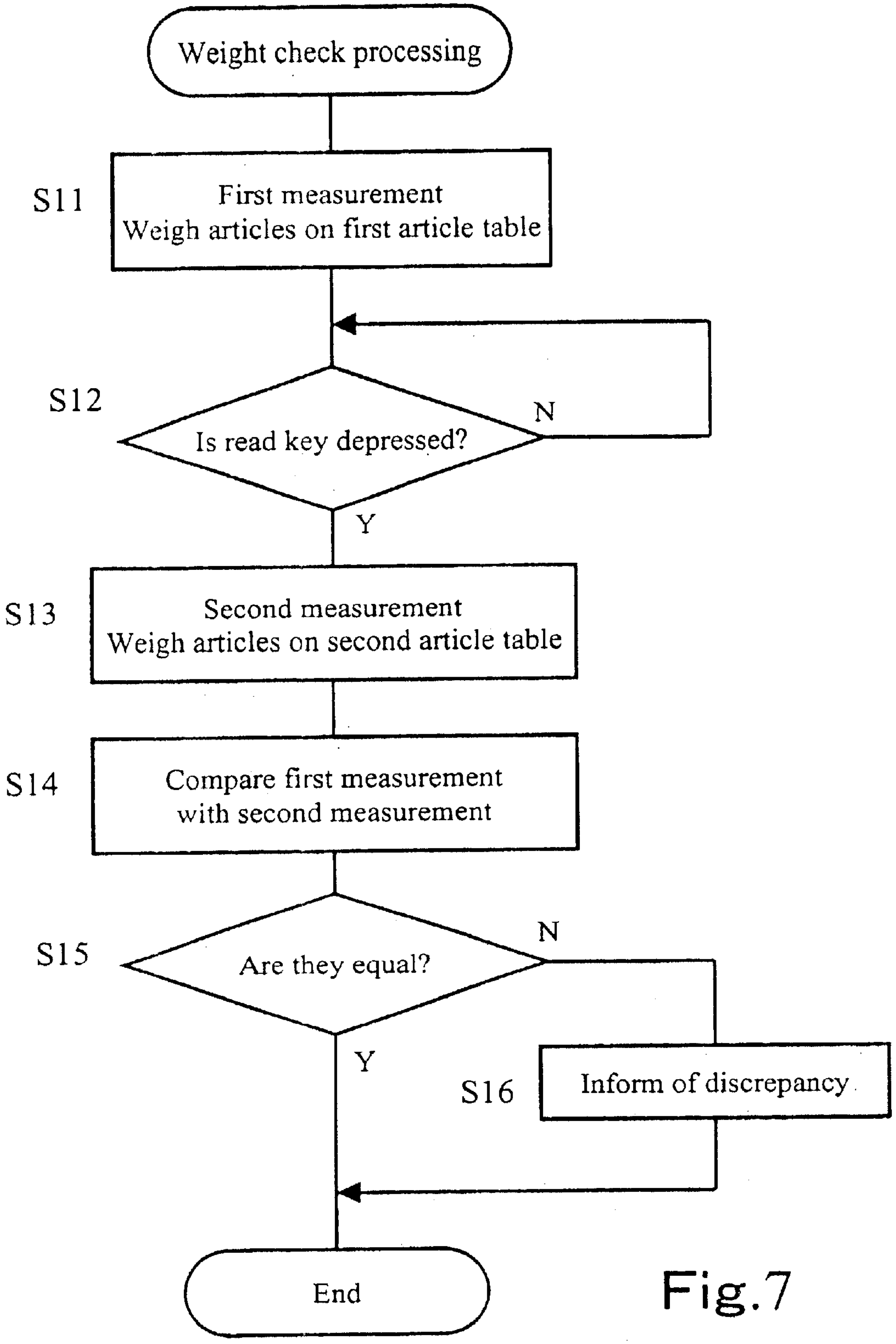
FIG. 7 is a flow chart exhibiting a flow in the weight check processing.

First, the operation mode switching processing will be explained. FIG. 3 is a flow chart exhibiting a flow of the operation mode switching processing; FIG. 4 is a front view showing an example of a screen to be displayed on the first display 4 in the customer operation mode; FIG. 5 is a front view showing another example of a screen to be displayed on the first display 4 in the customer operation mode; FIG. 6 is a front view showing an example of a screen to be displayed on the first display 4 in the store-clerk operation mode.

After the startup, the article data reading apparatus 1 is set to the customer operation mode (step S1). In this customer operation mode, an image data file for the customer operation mode is called from the image data files stored in the RAM 20, customer operation screens are displayed on the first display 4 based on the image data file thus called. These customer operation screens exhibit user-friendly operational information regarding customer's operations, for example, a guidance for a customer in operating procedures on reading article information by the scanner and ending the reading, etc. Herein, FIGS. 4 and 5 exemplify customer operation screens 30 and 31. In this embodiment, these customer operation screens 30 and 31 are alternately displayed at a predetermined interval.

In this customer operation mode, electric current to the second display 6 is set to be turned off, while electric current to the first and second scales 10, 11 is set to be turned on. Thereby the first and second scales 10, 11 are enabled (to perform their functions) so that measurements of article weights for detecting an abuse by a customer can be carried out. Since the customer operation mode is assumed to be used only by a customer, displaying on the second display 6 is not required. The article information read processing in the customer operation mode under this circumstance will be described later.

After the operation mode is set to the customer operation mode in step S1, the apparatus waits for the operation mode switch key 15*c* to be depressed (step S2). When depressing of the operation mode switch key 15*c* is recognized (Y in step S2), the operation mode is switched to the store-clerk operation mode. Herein, a function of operation mode setting means is carried out. In this the store-clerk operation mode, an image data file for the store-clerk operation mode is called from the image data files stored in the RAM 20, and store-clerk operation screens are displayed based on the image data file thus called. This store-clerk operation screens exhibit operational information regarding operations by a store-clerk, which are designed to be convenient for a store clerk. FIG. 6 exemplifies a store-clerk operation screen 32. This store-clerk operation screen 32 provides an information display area 33 for displaying articles information, an article key 34 for designating an article, function keys 35 for executing various operations, and others.

In this store-clerk operation mode, setting is made so that electric current to the second display 6 is turned on and electric current to the first and second scales 10, 11 is turned off. Thereby, the second display 6 is enabled to display information for a customer as an operation requester. Although functions of the first and second scales 10, 11 are disabled in this mode, there should be no problem since this store-clerk operation mode is assumed to be used only by a store clerk. Processing for reading article information in this store-clerk operation mode will be described later.

After the operation mode is set to the store-clerk operation mode in step S3, the apparatus waits for the operation mode switching key 15*c* to be depressed (step S4), as in step S2. When depressing of the operation mode switch key 15*c* is recognized (Y in step S4), the process returns to the step S1, setting the operation mode back to the customer operation mode. Herein, the operation mode setting means comes to perform its function.

If it is so recognized that, in step S2, the operation mode switch key 15*c* is not depressed (N in step S2), but the operation end key 15*a* is depressed instead (Y in step S5), or that, in step S4, the operation mode switch key 15*c* is not depressed (N in step S4), but the operation end key 15*a* is depressed instead (Y in step S6), this operation mode switching processing terminates.

Now, brief explanation will be made for the article information read processing in the customer operation mode and the store-clerk operation mode along with operation of barcode reading by the operator.

First, explanation is made assuming that the operation mode is set to the customer operation mode where a customer acts as the operator. First of all, a barcode attached to an article is read by the barcode scanner 3 according to the operation by a customer. At this time, a first shopping basket containing articles is placed on the first article table 8, and a second shopping basket that is empty is placed on the second article table 9. In this state, a customer picks up an article from the first basket one by one, moves each article letting a barcode attached thereto face the barcode reading window 12, and puts it into the second shopping basket. The barcode scanner 3 reads a barcode of the article as the article passes in front of the barcode reading window 12. Article information pertaining to the article that is recorded as a barcode and now read by the barcode scanner 3 is sent to a POS terminal. In this customer operation mode, article information, for example, unit price of the article, that corresponds to the barcode information of an article now read by the barcode scanner 3 is displayed in the first display 4 in reference to the PLU file stored in the RAM 20.

When a read end key 15*b* is depressed by the customer after the barcode reading by the barcode scanner 3, a signal that declares end of the barcode reading is sent to a POS terminal. Then, the POS terminal having received the barcode information performs registration and payment processing according to an operation by a cashier.

During this article information read processing in the customer operation mode as described above, an articles weight check processing as an abuse check processing is concurrently performed. A flow of this abuse check processing will now be described in connection with the flow chart in FIG. 7.

First, at a stage when articles as contained in a shopping basket are placed on the first article table 8, a total weight of the articles on the first article table 8 is weighed together with the first shopping basket by the first scale (first measurement: step S11). Then, the weight of the articles thus measured is memorized in the RAM 20 as a first measured value.

Subsequently, the apparatus waits for the customer to depress the read end key 15*b* after completing the operation of the barcode reading (Y in step S12). If depressing of the read end key 15*b* is recognized (Y in step S12), a total weight of the articles placed on the second article table 9 including the second shopping basket is measured (second measurement: step S13). Then, the weight of the articles thus measured is memorized in the RAM 20 as a second measured value.

Then, the first measured value and the second measure value memorized in the RAM 20 are compared to each other (step S14). Herein, a weight comparison function is carried out. It is provided here that respective weights of the first basket and second basket are the same. If the values in the first measurement and the second measurement are nearly the same (allowing measurement errors, etc.) (Y in step S15), the processing is terminated. If these values differ from one to another (N in step S15), the discrepancy is displayed on the first display 4. At the same time, a signal indicating such discrepancy is transmitted to a POS terminal, informing both the customer and store clerk that the measured values in the result of the weight check differ (step S16). Herein, a function of an informing means is carried out.

Now, explanation will be made for the case where the store-clerk operation mode is set, assuming a customer to become an operation requester and a store clerk to become the operator. First, according to an operation by a store clerk, barcode reading of articles by the barcode scanner 3 is carried out. The operation by the store clerk at this time is the same as that by a customer as described in the above. In the store-clerk operation mode, article information, for example, a unit price of the article, that corresponds to the barcode information of an article read by the barcode scanner 3 is displayed in the first display 4 and the second display 6 in reference to the PLU file stored in the RAM 20. When the read end key 15*b* is depressed by a customer after performing the barcode reading by the barcode scanner 3, a signal declaring end of the barcode reading is sent to a POS terminal. Then, the POS terminal having received the barcode information performs registration and payment processing according to an operation by a cashier. In this store-clerk operation mode, the abuse check processing is not performed.

As described in the above, the article data reading apparatus 1 according to the present embodiment permits the operators to make the setting such that, when a customer operates it, the operation mode can be set to the customer operation mode so as to suit for customer's use, and that, when a store clerk operates it, the mode can be set to the store-clerk operation mode so as to suit for store-clerk's use. Thus, in stores where either a customer or a store clerk operates the apparatus, operability for both the customer and the store clerk can be improved, and operating speed of the apparatus when used both by a customer and a store clerk can also be improved.

In addition, in the store-clerk operation mode, because electric current to the second display 6 is turned off, energy can be saved eliminating useless display.

Furthermore, in the store-clerk operation mode, because electric current to the first and second scales 10, 11 is turned off, energy can be saved eliminating useless measurements.

Although in the present embodiment the first measurement value was provided by the measurement of weight of articles placed on the first article table 8, obtaining the first measurement value need not be limited to the way as described. Instead, the first measurement value may be provided by, for example, acquiring article weight information corresponding to barcode information of the articles that have been read by the barcode scanner 3, consulting with the PLU file stored in the RAM 20.

Although in the present embodiment the first article table 8 as the first article table section and the second article table 9 as the second article table section were separately provided at the left and right of the stem 7, it need not be limited to this arrangement. Instead, the first article table section and the second article table section may be provided as an integrated one part.

Also, although in the store-clerk operation mode according to the present embodiment electric current to the first and second scales 10, 11 were turned off, it need not do so. Instead, the electric current to the first and second scales 10, 11 are turned on so that the weight check processing can be performed in the store-clerk operation mode as well.

As described in the above, in this embodiment, the article table 2 includes the first article table 8 as the first article table section on which an article before barcode reading of a barcode as a coded symbol by the barcode scanner 3 as the reading section is placed and the second article table 9 as the second article table section for placing an article after the barcode has been read by the barcode scanner 3 as the reading section; the apparatus comprises: the first weight information acquisition means for acquiring weight information of an article before the article is placed on the second article table 9 in the customer operation mode; the second weight information acquisition means for acquiring weight information of an article by measuring a weight of the article placed on the second article table 9; and an informing means for informing so, if their information is found to be different from each other based on the respective weight information acquired by the first weight information acquisition means and the second weight information acquisition means. Thus, an improper act by a customer in that, when a customer operates the apparatus in the customer operation mode, he or she fails to carry out reading of a coded symbol attached to an article, can be prevented.

Furthermore, according to the article data reading apparatus of the present invention, the operation mode can be selectively set to the customer operation mode and the store-clerk operation mode, whereby when the operation mode is set to the customer operation mode, customer operational information relating to customer's operation is displayed in the fist display, while store clerk operational information relating to store-clerk's operation is displayed in the fist display when the store-clerk operation mode is set. In this way, the operation mode can be set to the customer operation mode when a customer operates the apparatus, whereas the operation mode can be set to store-clerk operation mode when a store clerk operates it; thereby, operability for both a customer and a store clerk can be improved.

What is claimed is:

1. An article data reading apparatus, comprising:

an article table, located at a position, which places an article for sale;

a reading section which optically reads, during a reading operation, a coded symbol attached to the article for sale by an operator, the reading section being arranged in the apparatus such that the reading operation is performed by the operator only at one side of the article table;

a first display, facing the same side where the reading operation is performed by the operator, which displays;

a second display, facing a side opposite to the one side of the article table, which displays information;

operation mode setting means for selectively setting operation mode to either a customer operation mode in which the coded symbol attached to the article for sale is read through the reading section by a customer as an operator or a store-clerk operation mode in which the coded symbol attached to the article for sale is read through the reading section by a store clerk as an operator;

a memory section for memorizing customer operation information regarding operation by a customer when a customer becomes the operator, and store-clerk operation information regarding operation by a store clerk when a customer becomes the operation requester and a store clerk becomes the operator;

a first display means effective in the customer operation mode for causing the first display to display said customer operation information memorized in said memory section when the customer operation mode is set by the operation mode setting means; and a second display means effective in the store-clerk operation mode for causing the first display to displays said store-clerk operation information memorized in said memory section and causing said second display to display article information based on the coded symbol of the article for sale read by said reading section when the store-clerk operation mode is set by the operation mode setting means.

2. The article data reading apparatus according to claim 1, wherein said article table includes a first article table section for placing the article before said reading section reads the coded symbol and a second article table section for placing the article for which said reading section has read the coded symbol; said apparatus further comprising:

first weight information acquisition means for acquiring weight information of the article before placed on said second article table section in the customer operation mode;

second weight information acquisition means for acquiring weight information of the article by measuring by a scale a weight of the article placed on the second article table section in the customer operation mode; and informing means for informing of discrepancy of weight information in the customer operation mode based on the weight information obtained by said first and second weight information acquisition means, if the respective weight information differs from each other.

3. The article data reading apparatus according to claim 2, further comprising, weight comparison means for comparing said respective weight information obtained by said first and second weight information acquisition means with each other in the customer operation mode, wherein said informing means informs of discrepancy of weight information, if the weight information obtained by said first and second weight information acquisition means is found to differ from each other as a result of comparison by said weight comparison means.

4. The article data reading apparatus according to claim 3, wherein, in the store-clerk operation mode, the weight information is not acquired from the first weight information acquisition means and the second weight information acquisition means.

5. The article data reading apparatus according to claim 4, in the store-clerk operation mode, electric current to said second weight information acquisition means is turned off.

6. The article data reading apparatus according to claim 2, wherein a touch panel is mounted onto a display surface of said first display.

7. The article data reading apparatus according to claim 2, wherein, in the store-clerk operation mode, the weight information is not acquired from the first and second weight information acquisition means.

8. The article data reading apparatus according to claim 1, wherein a touch panel is mounted onto a display surface of said first display.

9. The article data reading apparatus according to claim 1, wherein, in the customer operation mode, electric current to said first display is turned on enabling said first display means and electric current to said second display means is turned off.

10. The article data reading apparatus according to claim 1, wherein the article information includes price information of an article.

11. The article data reading apparatus according to claim 1, wherein the operation mode setting means includes an operation mode setting button for switching the operation mode.

* * * * *